US011558835B2

(12) United States Patent
Park et al.

(10) Patent No.: US 11,558,835 B2
(45) Date of Patent: Jan. 17, 2023

(54) MULTI-SYNCHRONIZATION SIGNAL BLOCK OPERATION

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Jing Sun, San Diego, CA (US); Xiaoxia Zhang, San Diego, CA (US); Zhifei Fan, San Diego, CA (US); Arumugam Chendamarai Kannan, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/248,991

(22) Filed: Feb. 16, 2021

(65) Prior Publication Data

US 2021/0258900 A1 Aug. 19, 2021

Related U.S. Application Data

(60) Provisional application No. 62/978,218, filed on Feb. 18, 2020.

(51) Int. Cl.
*H04W 56/00* (2009.01)
*H04L 27/26* (2006.01)

(52) U.S. Cl.
CPC ..... *H04W 56/001* (2013.01); *H04L 27/26025* (2021.01); *H04L 27/2663* (2013.01); *H04L 27/2665* (2013.01)

(58) Field of Classification Search
None
See application file for complete search history.

(56) References Cited

U.S. PATENT DOCUMENTS

| 11,271,699 | B1 * | 3/2022 | Eyuboglu | H04B 7/0626 |
| 2018/0184391 | A1 | 6/2018 | Ly et al. | |
| 2018/0343671 | A1 | 11/2018 | Sun et al. | |
| 2021/0051683 | A1 * | 2/2021 | Li | H04W 74/0808 |
| 2021/0321413 | A1 * | 10/2021 | Shin | H04W 72/042 |

OTHER PUBLICATIONS

International Search Report and Written Opinion—PCT/US2021/070161—ISA/EPO—dated May 3, 2021.

* cited by examiner

*Primary Examiner* — Otis L Thompson, Jr.
(74) *Attorney, Agent, or Firm* — Harrity & Harrity, LLP (57) ABSTRACT

Various aspects of the present disclosure generally relate to wireless communication. In some aspects, a base station (BS) may transmit a first set of synchronization signal block (SSB) burst sets with a first set of SSB parameters; and transmit a second set of SSB burst sets with a second set of SSB parameters, wherein the first set of SSB burst sets and the second set of SSB burst sets are transmitted in a common carrier. In some aspects, a user equipment (UE) may receive at least one SSB of the first set of SSB burst sets or the second set of SSB burst sets. Numerous other aspects are provided.

24 Claims, 6 Drawing Sheets

MULTI-SYNCHRONIZATION SIGNAL BLOCK OPERATION

CROSS-REFERENCE TO RELATED APPLICATION

This Patent Applications claims priority to U.S. Provisional Patent Application No. 62/978,218, filed on Feb. 18, 2020, entitled "MULTI-SYNCHRONIZATION SIGNAL BLOCK OPERATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for multi-synchronization signal block operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a base station (BS), may include transmitting a first set of synchronization signal block (SSB) burst sets with a first set of SSB parameters; and transmitting a second set of SSB burst sets with a second set of SSB parameters, wherein the first set of SSB burst sets and the second set of SSB burst sets are transmitted in a common carrier.

In some aspects, a method of wireless communication, performed by a user equipment (UE), may include identifying a resource for receiving a synchronization signal block (SSB) of a particular SSB burst set, of a plurality of types of SSB burst sets, wherein the plurality of types of SSB burst sets includes a first set of SSB burst sets with a first set of SSB parameters and a second set of SSB burst sets with a second set of SSB parameters, and wherein the first set of SSB burst sets and the second set of SSB burst sets are transmitted in a common carrier; and receiving, in the resource, the SSB of the particular SSB burst set.

In some aspects, a BS for wireless communication may include a memory and one or more processors operatively coupled to the memory. The memory and the one or more processors may be configured to transmit a first set of SSB burst sets with a first set of SSB parameters; and transmit a second set of SSB burst sets with a second set of SSB parameters, wherein the first set of SSB burst sets and the second set of SSB burst sets are transmitted in a common carrier.

In some aspects, a UE for wireless communication may include a memory and one or more processors operatively coupled to the memory. The memory and the one or more processors may be configured to identify a resource for receiving an SSB of a particular SSB burst set, of a plurality of types of SSB burst sets, wherein the plurality of types of SSB burst sets includes a first set of SSB burst sets with a first set of SSB parameters and a second set of SSB burst sets with a second set of SSB parameters, and wherein the first set of SSB burst sets and the second set of SSB burst sets are transmitted in a common carrier; and receive, in the resource, the SSB of the particular SSB burst set.

In some aspects, a non-transitory computer-readable medium may store one or more instructions for wireless communication. The one or more instructions, when executed by one or more processors of a BS, may cause the one or more processors to transmit a first set of SSB burst sets with a first set of SSB parameters; and transmit a second set of SSB burst sets with a second set of SSB parameters, wherein the first set of SSB burst sets and the second set of SSB burst sets are transmitted in a common carrier.

In some aspects, a non-transitory computer-readable medium may store one or more instructions for wireless communication. The one or more instructions, when executed by one or more processors of a UE, may cause the one or more processors to identify a resource for receiving an SSB of a particular SSB burst set, of a plurality of types of SSB burst sets, wherein the plurality of types of SSB burst sets includes a first set of SSB burst sets with a first set of SSB parameters and a second set of SSB burst sets with a second set of SSB parameters, and wherein the first set of SSB burst sets and the second set of SSB burst sets are transmitted in a common carrier; and receive, in the resource, the SSB of the particular SSB burst set.

In some aspects, an apparatus for wireless communication may include means for transmitting a first set of SSB burst sets with a first set of SSB parameters; and means for transmitting a second set of SSB burst sets with a second set of SSB parameters, wherein the first set of SSB burst sets and the second set of SSB burst sets are transmitted in a common carrier.

In some aspects, an apparatus for wireless communication may include means for identifying a resource for receiving an SSB of a particular SSB burst set, of a plurality of types of SSB burst sets, wherein the plurality of types of SSB burst sets includes a first set of SSB burst sets with a first set of SSB parameters and a second set of SSB burst sets with a second set of SSB parameters, and wherein the first set of SSB burst sets and the second set of SSB burst sets are transmitted in a common carrier; and Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
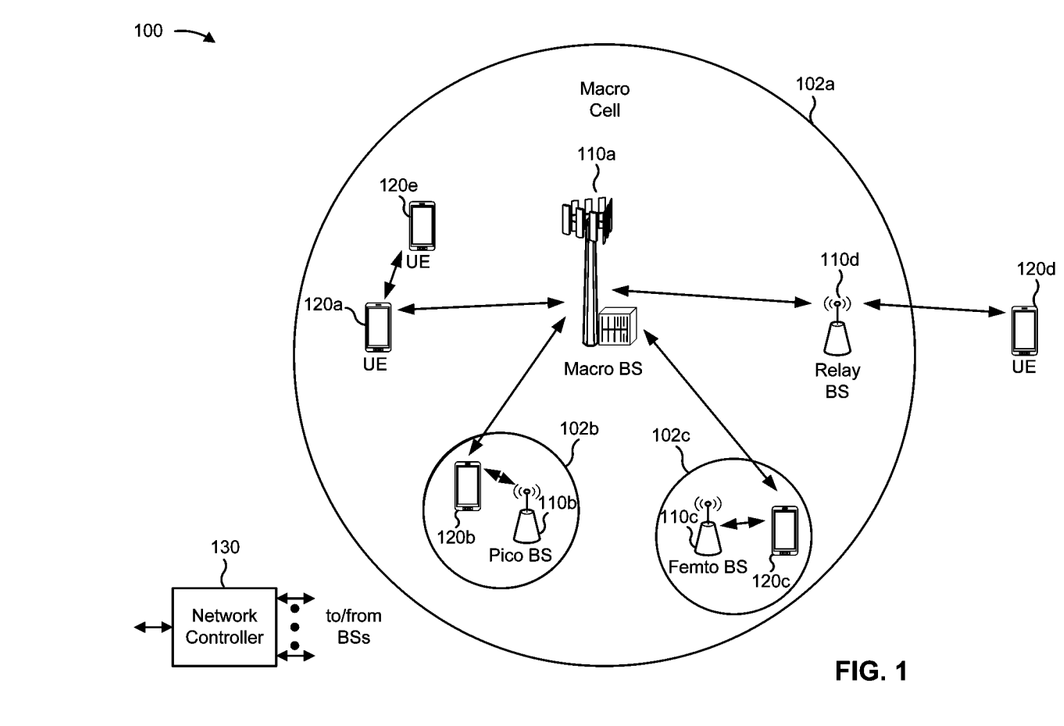
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another).

For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
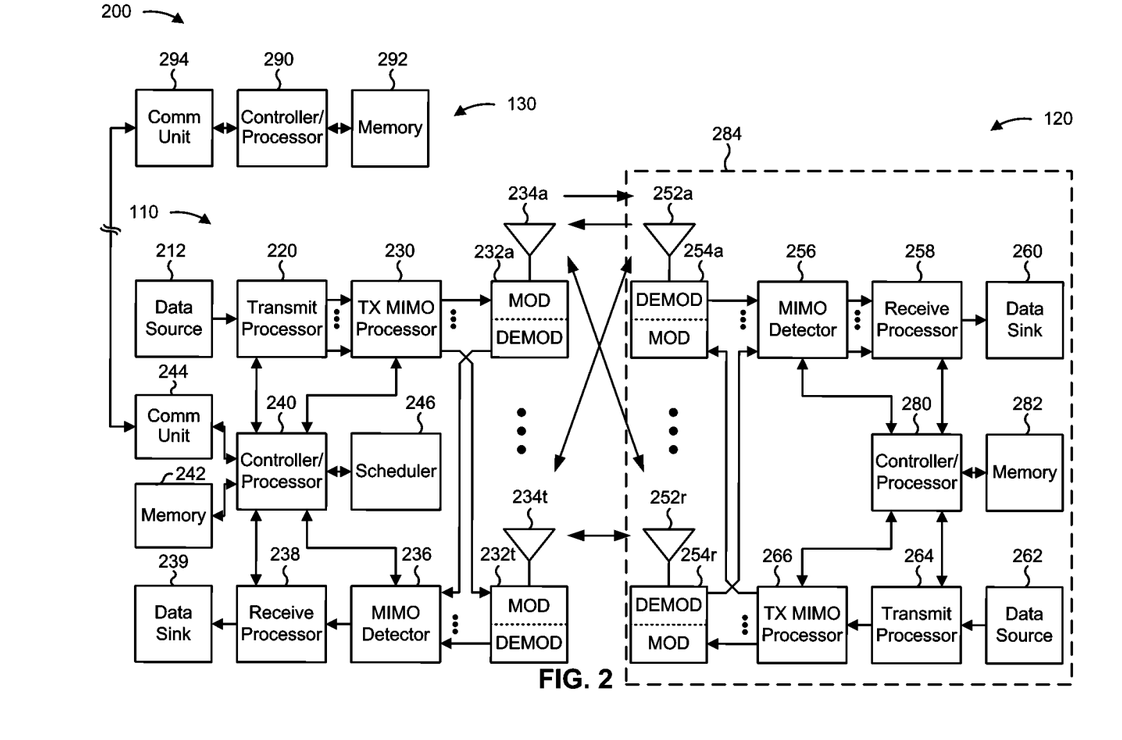
FIG. 2 is a diagram illustrating an example of a base station in communication with a UE in a wireless communication network, in accordance with various aspects of the present disclosure.

FIG. 2 is a diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with multi-synchronization signal block operation, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6 and/or other processes as described herein. A scheduler 246 may schedule UEs for data transmission on the downlink and/or uplink.

In some aspects, UE 120 may include means for identifying a resource for receiving a synchronization signal block (SSB) of a particular SSB burst set, of a plurality of types of SSB burst sets, means for receiving, in the resource, the SSB of the particular SSB burst set, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a first set of SSB burst sets with a first set of SSB parameters, means for transmitting a second set of SSB burst sets with a second set of SSB parameters, wherein the first set of SSB burst sets and the second set of SSB burst sets are transmitted in a common carrier, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
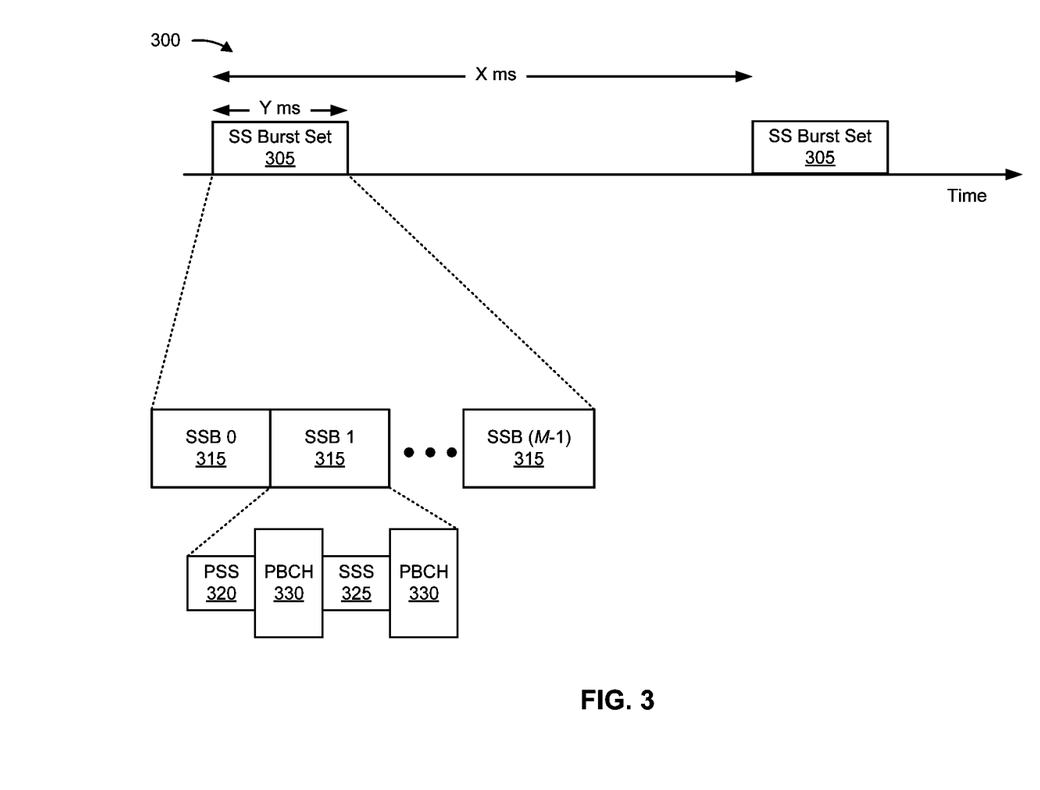
FIG. 3 is a diagram illustrating an example of a synchronization signal (SS) hierarchy, in accordance with various aspects of the present disclosure.

FIG. 3 is a diagram illustrating an example 300 of a synchronization signal (SS) hierarchy for transmitting SSBs, in accordance with various aspects of the present disclosure. As shown in FIG. 3, the SS hierarchy may include an SS burst set 305 (which may also be termed an SSB burst set). As described in more detail herein, a BS may be configured to transmit multiple types of burst sets, such as a first burst set with a first set of parameters, a second burst set with a second set of parameters, and/or the like. As further shown, each SS burst set 305 may include one or more SS blocks (SSBs) 315, shown as SSB 0 through SSB M−1, where M is a maximum number of SSBs 315 that can be carried by an SS burst set 305. In some aspects, different SSBs 315 may be beam-formed differently (e.g., transmitted using different beams), and may be used for beam management, beam selection, and/or the like (e.g., as part of an initial network access procedure). In some aspects, different SS burst sets 305 may have differently configured SSBs 315, such as SSBs 315 with different frequency resource allocations, time resource allocations, and/or the like. An SS burst set 305 may be periodically transmitted by a wireless node (e.g., BS 110), such as every X milliseconds, as shown in FIG. 3. In some aspects, different SS burst sets 305 may have different periodicities. In some aspects, an SS burst set 305 may have a fixed or dynamic length, shown as Y milliseconds in FIG. 3.

In some aspects, an SSB 315 may include resources that carry a primary synchronization signal (PSS) 320, a secondary synchronization signal (SSS) 325, a physical broadcast channel (PBCH) 330, and/or the like. In some aspects, multiple SSBs 315 are included in an SS burst set 305 (e.g., with transmission on different beams), and the PSS 320, the SSS 325, and/or the PBCH 330 may be the same across each SSB 315 of the SS burst set 305. In some aspects, a single SSB 315 may be included in an SS burst set 305. In some aspects, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two symbols). In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of the SS burst set 305 may be transmitted in consecutive radio resources (e.g., consecutive symbols) during one or more slots. Additionally, or alternatively, one or more SSBs 315 of the SS burst set 305 may be transmitted in non-consecutive radio resources.

In some aspects, the SS burst set 305 may have a burst set periodicity, whereby the SSBs 315 of the SS burst set 305 are transmitted by the wireless node according to the fixed burst set periodicity. In other words, the SSBs 315 may be repeated during each SS burst set 305.

In some aspects, an SSB 315 may include an SSB index that corresponds to a beam used to carry the SSB 315. A UE 120 may monitor for and/or measure SSBs 315 using different receive (Rx) beams during an initial network access procedure. Based at least in part on the monitoring and/or measuring, the UE 120 may indicate one or more SSBs 315 with a best signal parameter (e.g., a reference signal received power (RSRP) parameter and/or the like) to a BS 110. The BS 110 and the UE 120 may use the one or more indicated SSBs 315 to select one or more beams to be used for communication between the base station 110 and the UE 120 (e.g., for a random access channel (RACH) procedure and/or the like).

As indicated above, FIG. 3 is provided as an example. Other examples may differ from what is described with regard to FIG. 3.

In some communications systems, different frequency bands may be associated with different subcarrier spacings (SCSs). For example, for frequency band 2× (FR2×) and frequency band 4 (FR4), a network may use a relatively large SCS to cover a wider bandwidth than for other frequency bands. A large SCS enables faster beam sweeping. Moreover, when an SSB SCS is different from a data SCS, using a large SCS may result in an SSB blocking fewer data symbols relative to using a relatively small SCS. Furthermore, a large SCS may result in reduced searching complexity in a frequency domain (e.g., thereby enabling a relatively sparser synchronization raster compared with a smaller SCS).

In contrast, there are also benefits to using a relatively small SCS for an SSB, as may be used with lower frequency bands. For example, a small SCS may enable improved coverage by enabling a higher energy level in a time domain relative to using a large SCS. Moreover, a small SCS may result in reduced searching complexity in a time domain. Whether a relatively large SCS or a relatively small SCS is more beneficial for an SSB may be related to a use case of a UE that is to receive the SSB.

Some aspects described herein enable use of a plurality of types of SSBs in a single cell. For example, a BS may transmit, toward a UE, a first group of SSB burst sets that include SSBs with a first set of parameters, such as a first SCS, and a second group of SSB burst sets that include SSBs with a second set of parameters, such as a second SCS. In this case, the first group of SSB burst sets and the second group of SSB burst sets may differ with regard to an SCS, a location in a frequency domain, an SSB burst set periodicity, a quantity of SSBs within an SSB burst set, and/or the like. In this way, the BS and the UE enable benefits of both small SCSs and large SCSs for SSBs in a network. For example, based at least in part on a use case of a UE, the UE may select which SSB to monitor, thereby achieving benefits associated with a set of parameters of the selected SSB as applied to the use case, as described in more detail herein.

Figure 4:
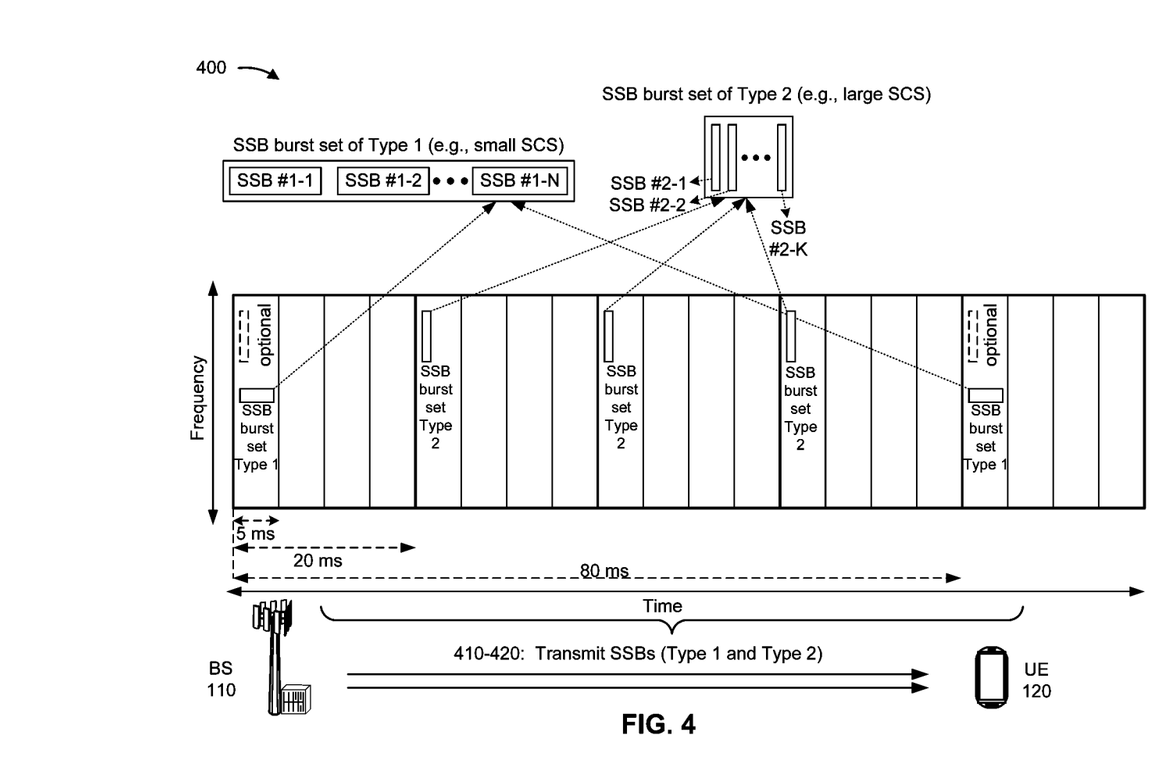
FIG. 4 is a diagram illustrating an example of multi-synchronization signal block operation, in accordance with various aspects of the present disclosure.

FIG. 4 is a diagram illustrating an example 400 of multi-SSB operation, in accordance with various aspects of the present disclosure. As shown in FIG. 4, example 400 includes a BS 110 and a UE 120.

As shown in FIG. 4, and by reference numbers 410 and 420, BS 110 may transmit a first set of SSB burst sets and a second set of SSB burst sets. For example, BS 110 may transmit a first set of SSB burst sets that is associated with a first set of parameters, such as a first SCS, and a second set of SSB burst sets that is associated with a second set of parameters, such as a second SCS. In this case, as shown, the first set of SSB burst sets may include a first type of SSB with a relatively small SCS and the second set of SSB burst sets may include a second type of SSB with a relatively large SCS. For example, the first type of SSB may have an SCS of approximately 240 kilohertz (kHz) and the second type of SSB may have an SCS of approximately 960 kHz. Although some aspects are described herein in terms of two types of SSBs, other configurations may be possible, such as other types of SSBs with other parameters, other quantities of types of SSBs, and/or the like.

Additionally, or alternatively, the first type of SSB and the second type of SSB may differ with regard to SSB burst set period. For example, the first type of SSB may be associated with an SSB burst set period of approximately 80 milliseconds (ms) and the second type of SSB may be associated with an SSB burst set period of 20 ms. Additionally, or alternatively, the first type of SSB and the second type of SSB may differ with regard to a quantity of SSBs within an SSB burst set. For example, each SSB burst set of the first set of SSB burst sets may include N SSBs and each SSB burst set of the second set of SSB burst sets may include K SSBs.

In some aspects, BS 110 may include different contents in the first type of SSB and the second type of SSB. For example, BS 110 may include a primary synchronization signal (PSS), a secondary synchronization signal (SSS), and a physical broadcast channel (PBCH) in the first type of SSB. In contrast, BS 110 may omit the PBCH from the second type of SSB. In some aspects, BS 110 may forgo transmitting some SSBs in some frames. For example, when, based at least in part on respective periodicities, an SSB burst set of the first type of SSB and an SSB burst set of the second type of SSB are to be transmitted in the same frame, BS 110 may forgo transmitting the SSB burst set of the second type of SSB. Additionally, or alternatively, BS 110 may transmit both SSB burst sets in the same frame.

In some aspects, UE 120 may monitor to receive at least one SSB of at least one SSB burst set. For example, UE 120 may select which SSB to receive based at least in part on a mode of UE 120. In this case, when UE 120 is in a radio resource control (RRC)-IDLE state (e.g., initial access), UE 120 may monitor to receive the first type of SSB in an SSB burst set. In this case, UE 120 may use the first type of SSB for cell searching based at least in part on UE 120 not being pre-configured with a frequency or time location of any SSB. In this way, by using the first type of SSB (e.g., with a smaller SCS), UE 120 can obtain an SSB with reduced complexity relative to using the second type of SSB. In contrast, when UE 120 is an RRC-CONNECTED state, an RRC-INACTIVE state, and/or the like UE 120 may receive information identifying a frequency and time location of the second type of SSB and may monitor for the second type of SSB. In this case, based at least in part on using the second type of SSB (e.g., with a larger SCS), UE 120 may achieve faster beam management and improved neighbor cell searching for handover.

Additionally, or alternatively, UE 120 may monitor to receive at least one SSB for time refinement. For example, UE 120 may use the first type of SSB (e.g., with a relatively small SCS) for coarse time refinement and the second type of SSB (e.g., with a relatively large SCS) for fine time refinement. In this case, UE 120 may use the first type of SSB for initial access with low searcher complexity and achieve coarse time refinement (e.g., and may receive, in the first type of SSB, information to enable detection of the second type of SSB) and may subsequently use the second type of SSB for fine time refinement.

As indicated above, FIG. 4 is provided as an example. Other examples may differ from what is described with respect to FIG. 4.

Figure 5:
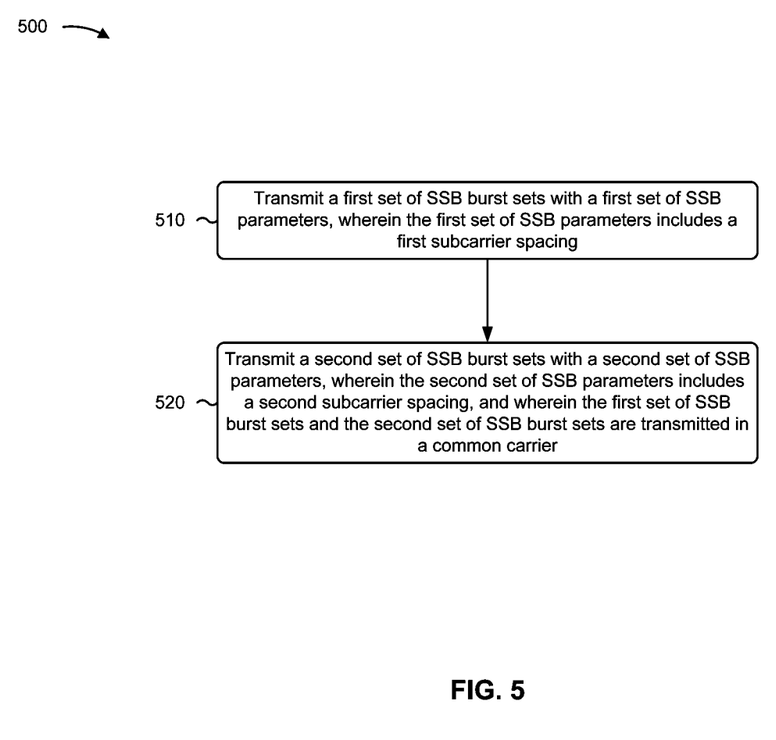
FIG. 5 is a diagram illustrating an example process performed, for example, by a base station, in accordance with various aspects of the present disclosure.

FIG. 5 is a diagram illustrating an example process 500 performed, for example, by a BS, in accordance with various aspects of the present disclosure. Example process 500 is an example where the BS (e.g., BS 110 and/or the like) performs operations associated with multi-SSB operation.

As shown in FIG. 5, in some aspects, process 500 may include transmitting a first set of SSB burst sets with a first set of SSB parameters, wherein the first set of SSB parameters includes a first subcarrier spacing (block 510). For example, the BS (e.g., using transmit processor 220, receive processor 238, controller/processor 240, memory 242, and/or the like) may transmit a first set of SSB burst sets with a first set of SSB parameters, as described above. In some aspects, the first set of SSB parameters includes a first subcarrier spacing.

As further shown in FIG. 5, in some aspects, process 500 may include transmitting a second set of SSB burst sets with a second set of SSB parameters, wherein the second set of SSB parameters includes a second subcarrier spacing, and wherein the first set of SSB burst sets and the second set of SSB burst sets are transmitted in a common carrier (block 520). For example, the BS (e.g., using transmit processor 220, receive processor 238, controller/processor 240, memory 242, and/or the like) may transmit a second set of SSB burst sets with a second set of SSB parameters, as described above. In some aspects, the second set of SSB parameters includes a second subcarrier spacing. In some aspects, the first set of SSB burst sets and the second set of SSB burst sets are transmitted in a common carrier.

Process 500 may include additional aspects, such as any single aspect or any combination of aspects described below and/or in connection with one or more other processes described elsewhere herein.

In a first aspect, the first set of SSB burst sets and the second set of SSB burst sets are transmitted in a common carrier such that at least one SSB burst set of the second set of SSB burst sets occurs during time resources between two consecutive SSB burst sets of the first set of SSB burst sets.

In a second aspect, alone or in combination with the first aspect, the first set of SSB parameters and the second set of SSB parameters differ with regard to at least one parameter, and the at least one parameter is at least one of: a subcarrier spacing, a frequency domain location, a set of component channels, whether an SSB is to be omitted in a concurrent frame, an SSB burst set periodicity, or a quantity of SSBs in each SSB burst set.

In a third aspect, alone or in combination with one or more of the first and second aspects, a first SSB burst set of the first set of SSB burst sets and a second SSB burst set of the second set of SSB burst sets are located in a common frame.

In a fourth aspect, alone or in combination with one or more of the first through third aspects, the BS is configured to transmit the first SSB burst set and the second SSB burst set in the common frame.

In a fifth aspect, alone or in combination with one or more of the first through fourth aspects, the BS is configured to drop one of the first SSB burst set or the second SSB burst set in the common frame.

In a sixth aspect, alone or in combination with one or more of the first through fifth aspects, a first one or more SSBs of the first SSB burst set include a physical broadcast channel and a second one or more SSBs of the second SSB burst set do not include the physical broadcast channel.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
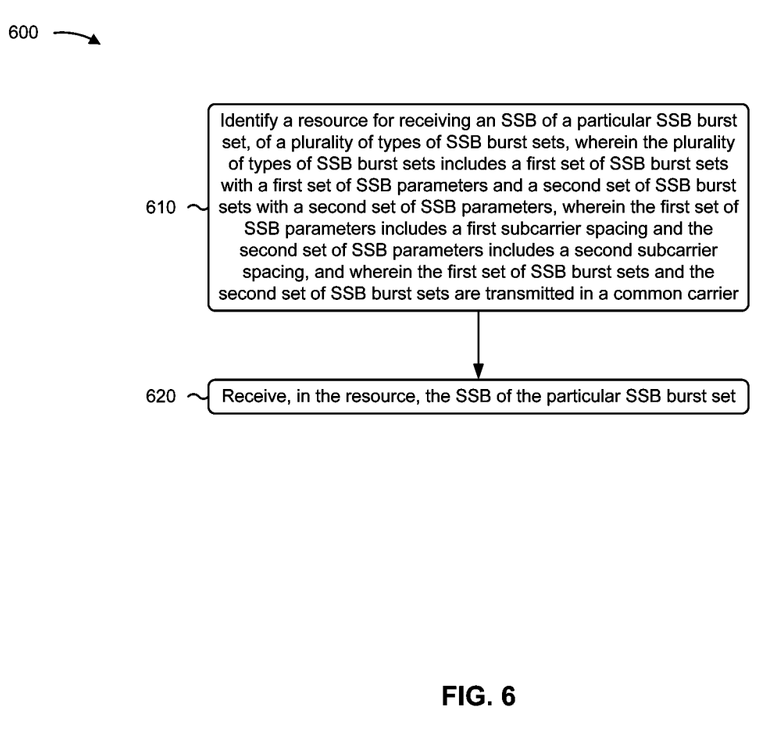
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with multi-synchronization signal block operation.

As shown in FIG. 6, in some aspects, process 600 may include identifying a resource for receiving an SSB of a particular SSB burst set, of a plurality of types of SSB burst sets, wherein the plurality of types of SSB burst sets includes a first set of SSB burst sets with a first set of SSB parameters and a second set of SSB burst sets with a second set of SSB parameters, wherein the first set of SSB parameters includes a first subcarrier spacing and the second set of SSB parameters includes a second subcarrier spacing, and wherein the first set of SSB burst sets and the second set of SSB burst sets are transmitted in a common carrier (block 610). For example, the UE (e.g., using receive processor 258, transmit processor 264, controller/processor 280, memory 282, and/or the like) may identify a resource for receiving an SSB of a particular SSB burst set, of a plurality of types of SSB burst sets, as described above. In some aspects, the plurality of types of SSB burst sets includes a first set of SSB burst sets with a first set of SSB parameters and a second set of SSB burst sets with a second set of SSB parameters. In some aspects, the first set of SSB parameters includes a first subcarrier spacing and the second set of SSB parameters includes a second subcarrier spacing. In some aspects, the first set of SSB burst sets and the second set of SSB burst sets are transmitted in a common carrier.

As further shown in FIG. 6, in some aspects, process 600 may include receiving, in the resource, the SSB of the particular SSB burst set (block 620). For example, the UE (e.g., using receive processor 258, transmit processor 264, controller/processor 280, memory 282, and/or the like) may receive, in the resource, the SSB of the particular SSB burst set, as described above.

Process 600 may include additional aspects, such as any single aspect or any combination of aspects described below and/or in connection with one or more other processes described elsewhere herein.

In a first aspect, the first set of SSB burst sets and the second set of SSB burst sets are transmitted in a common carrier such that at least one SSB burst set of the second set of SSB burst sets occurs during time resources between two consecutive SSB burst sets of the first set of SSB burst sets.

In a second aspect, alone or in combination with the first aspect, the first set of SSB parameters and the second set of SSB parameters differ with regard to at least one parameter, and the at least one parameter is at least one of: a subcarrier spacing, a frequency domain location, a set of component channels, whether an SSB is to be omitted in a concurrent frame, an SSB burst set periodicity, or a quantity of SSBs in each SSB burst set.

In a third aspect, alone or in combination with one or more of the first and second aspects, a first SSB burst set of the first set of SSB burst sets and a second SSB burst set of the second set of SSB burst sets are located in a common frame.

In a fourth aspect, alone or in combination with one or more of the first through third aspects, one of the first SSB burst set or the second SSB burst set is dropped in the common frame.

In a fifth aspect, alone or in combination with one or more of the first through fourth aspects, a first one or more SSBs of the first SSB burst set include a physical broadcast channel and a second one or more SSBs of the second SSB burst set do not include the physical broadcast channel.

In a sixth aspect, alone or in combination with one or more of the first through fifth aspects, process 600 includes selecting, from among the first set of SSB burst sets and the second set of SSB burst sets, the particular SSB burst set.

In a seventh aspect, alone or in combination with one or more of the first through sixth aspects, selecting the particular SSB burst set comprises: selecting the particular SSB burst set based at least in part on a state of the UE and a type of the particular SSB burst set.

In an eighth aspect, alone or in combination with one or more of the first through seventh aspects, selecting the particular SSB burst set comprises: selecting the particular SSB burst set on a use case of information included in the particular SSB burst set and a type of the particular SSB burst set.

In a ninth aspect, alone or in combination with one or more of the first through eighth aspects, the first subcarrier spacing is smaller than the second subcarrier spacing, wherein selecting the particular SSB burst set includes selecting one of the first set of SSB burst sets for radio resource control (RRC) idle (IDLE) operation, or the second set of SSB burst sets for RRC connected (CONNECTED) or RRC inactive (INACTIVE) operation.

In a tenth aspect, alone or in combination with one or more of the first through ninth aspects, the first subcarrier spacing is smaller than the second subcarrier spacing, wherein selecting the particular SSB burst set includes selecting one of the first set of SSB burst sets for relatively coarse time refinement, or the second set of SSB burst sets for relatively fine time refinement.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some aspects of the present disclosure:

Aspect 1: A method of wireless communication performed by a base station (BS), comprising: transmitting a first set of synchronization signal block (SSB) burst sets with a first set of SSB parameters, wherein the first set of SSB parameters includes a first subcarrier spacing; and transmitting a second set of SSB burst sets with a second set of SSB parameters, wherein the second set of SSB parameters includes a second subcarrier spacing, and wherein the first set of SSB burst sets and the second set of SSB burst sets are transmitted in a common carrier.

Aspect 2: The method of aspect 1, wherein the first set of SSB burst sets and the second set of SSB burst sets are transmitted in a common carrier such that at least one SSB burst set of the second set of SSB burst sets occurs during time resources between two consecutive SSB burst sets of the first set of SSB burst sets.

Aspect 3: The method of any of aspects 1 to 2, wherein the first set of SSB parameters and the second set of SSB parameters differ with regard to at least one parameter, and wherein the at least one parameter is at least one of: a subcarrier spacing, a frequency domain location, a set of component channels, whether an SSB is to be omitted in a concurrent frame, an SSB burst set periodicity, or a quantity of SSBs in each SSB burst set.

Aspect 4: The method of any of aspects 1 to 3, wherein a first SSB burst set of the first set of SSB burst sets and a second SSB burst set of the second set of SSB burst sets are located in a common frame.

Aspect 5: The method of aspect 4, wherein the BS is configured to transmit the first SSB burst set and the second SSB burst set in the common frame.

Aspect 6: The method of any of aspects 4 to 5, wherein the BS is configured to drop one of the first SSB burst set or the second SSB burst set in the common frame.

Aspect 7: The method of any of aspects 1 to 6, wherein a first one or more SSBs of the first SSB burst set include a physical broadcast channel and a second one or more SSBs of the second SSB burst set do not include the physical broadcast channel.

Aspect 8: A method of wireless communication performed by a user equipment (UE), comprising: identifying a resource for receiving a synchronization signal block (SSB) of a particular SSB burst set, of a plurality of types of SSB burst sets, wherein the plurality of types of SSB burst sets includes a first set of SSB burst sets with a first set of SSB parameters and a second set of SSB burst sets with a second set of SSB parameters, wherein the first set of SSB parameters includes a first subcarrier spacing and the second set of SSB parameters includes a second subcarrier spacing, and wherein the first set of SSB burst sets and the second set of SSB burst sets are transmitted in a common carrier; and receiving, in the resource, the SSB of the particular SSB burst set.

Aspect 9: The method of aspect 8, wherein the first set of SSB burst sets and the second set of SSB burst sets are transmitted in a common carrier such that at least one SSB burst set of the second set of SSB burst sets occurs during time resources between two consecutive SSB burst sets of the first set of SSB burst sets.

Aspect 10: The method of any of aspects 8 to 9, wherein the first set of SSB parameters and the second set of SSB parameters differ with regard to at least one parameter, and wherein the at least one parameter is at least one of: a subcarrier spacing, a frequency domain location, a set of component channels, whether an SSB is to be omitted in a concurrent frame, an SSB burst set periodicity, or a quantity of SSBs in each SSB burst set.

Aspect 11: The method of any of aspects 8 to 10, wherein a first SSB burst set of the first set of SSB burst sets and a second SSB burst set of the second set of SSB burst sets are located in a common frame.

Aspect 12: The method of aspect 11, wherein one of the first SSB burst set or the second SSB burst set is dropped in the common frame.

Aspect 13: The method of any of aspects 8 to 12, wherein a first one or more SSBs of the first SSB burst set include a physical broadcast channel and a second one or more SSBs of the second SSB burst set do not include the physical broadcast channel.

Aspect 14: The method of any of aspects 8 to 13, further comprising: selecting, from among the first set of SSB burst sets and the second set of SSB burst sets, the particular SSB burst set.

Aspect 15: The method of aspect 14, wherein selecting the particular SSB burst set comprises: selecting the particular SSB burst set based at least in part on a state of the UE and a type of the particular SSB burst set.

Aspect 16: The method of any of aspects 14 to 15, wherein selecting the particular SSB burst set comprises: selecting the particular SSB burst set on a use case of information included in the particular SSB burst set and a type of the particular SSB burst set.

Aspect 17: The method of any of aspects 14 to 16, wherein the first subcarrier spacing is smaller than the second subcarrier spacing, and wherein selecting the particular SSB burst set comprises: selecting one of: the first set of SSB burst sets for radio resource control (RRC) idle (IDLE) operation, or the second set of SSB burst sets for RRC connected (CONNECTED) or RRC inactive (INACTIVE) operation.

Aspect 18: The method of any of aspects 14 to 17, wherein the first subcarrier spacing is smaller than the second subcarrier spacing, and wherein selecting the particular SSB burst set comprises: selecting one of: the first set of SSB burst sets for relatively coarse time refinement, or the second set of SSB burst sets for relatively fine time refinement.

Aspect 19: An apparatus for wireless communication at a device, comprising a processor; memory coupled with the processor; and instructions stored in the memory and executable by the processor to cause the apparatus to perform the method of one or more aspects of aspects 1-7.

Aspect 20: A device for wireless communication, comprising a memory and one or more processors coupled to the memory, the memory and the one or more processors configured to perform the method of one or more aspects of aspects 1-7.

Aspect 21: An apparatus for wireless communication, comprising at least one means for performing the method of one or more aspects of aspects 1-7.

Aspect 22: A non-transitory computer-readable medium storing code for wireless communication, the code comprising instructions executable by a processor to perform the method of one or more aspects of aspects 1-7.

Aspect 23: A non-transitory computer-readable medium storing a set of instructions for wireless communication, the set of instructions comprising one or more instructions that, when executed by one or more processors of a device, cause the device to perform the method of one or more aspects of aspects 1-7.

Aspect 24: An apparatus for wireless communication at a device, comprising a processor; memory coupled with the processor; and instructions stored in the memory and executable by the processor to cause the apparatus to perform the method of one or more aspects of aspects 8-18.

Aspect 25: A device for wireless communication, comprising a memory and one or more processors coupled to the memory, the memory and the one or more processors configured to perform the method of one or more aspects of aspects 8-18.

Aspect 26: An apparatus for wireless communication, comprising at least one means for performing the method of one or more aspects of aspects 8-18.

Aspect 27: A non-transitory computer-readable medium storing code for wireless communication, the code comprising instructions executable by a processor to perform the method of one or more aspects of aspects 8-18.

Aspect 28: A non-transitory computer-readable medium storing a set of instructions for wireless communication, the set of instructions comprising one or more instructions that, when executed by one or more processors of a device, cause the device to perform the method of one or more aspects of aspects 8-18.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A base station (BS) for wireless communication, comprising:
   a memory; and
   one or more processors operatively coupled to the memory, the memory and the one or more processors configured to:
      transmit a first set of synchronization signal block (SSB) burst sets with a first set of SSB parameters, wherein the first set of SSB parameters includes a first subcarrier spacing; and
      transmit a second set of SSB burst sets with a second set of SSB parameters, wherein the second set of SSB parameters includes a second subcarrier spacing, and wherein the first set of SSB burst sets and the second set of SSB burst sets are transmitted in a common carrier,
      wherein a first SSB burst set of the first set of SSB burst sets and a second SSB burst set of the second set of SSB burst sets are located in a common frame, and
      wherein the BS is configured to drop one of the first SSB burst set or the second SSB burst set in the common frame.

2. The BS of claim 1, wherein the first set of SSB burst sets and the second set of SSB burst sets are transmitted in a common carrier such that at least one SSB burst set of the second set of SSB burst sets occurs during time resources between two consecutive SSB burst sets of the first set of SSB burst sets.

3. The BS of claim 1, wherein the first set of SSB parameters and the second set of SSB parameters differ with regard to at least one parameter, and
   wherein the at least one parameter is at least one of:
      a frequency domain location,
      a set of component channels,
      whether an SSB is to be omitted in a concurrent frame,
      an SSB burst set periodicity, or
      a quantity of SSBs in each SSB burst set.

4. The BS of claim 1, wherein the BS is configured to transmit the first SSB burst set and the second SSB burst set in the common frame.

5. The BS of claim 1, wherein a first one or more SSBs of the first SSB burst set include a physical broadcast channel and a second one or more SSBs of the second SSB burst set do not include the physical broadcast channel.

6. A user equipment (UE) for wireless communication, comprising:
   a memory; and
   one or more processors operatively coupled to the memory, the memory and the one or more processors configured to:
      identify a resource for receiving a synchronization signal block (SSB) of a particular SSB burst set, of a plurality of types of SSB burst sets,
         wherein the plurality of types of SSB burst sets includes a first set of SSB burst sets with a first set of SSB parameters and a second set of SSB burst sets with a second set of SSB parameters, wherein the first set of SSB parameters includes a first subcarrier spacing and the second set of SSB parameters includes a second subcarrier spacing, and
         wherein the first set of SSB burst sets and the second set of SSB burst sets are transmitted in a common carrier;
      select, from among the first set of SSB burst sets and the second set of SSB burst sets, a particular SSB burst set, the particular SSB burst set being one of:
         the first set of SSB burst sets for radio resource control (RRC) idle (IDLE) operation, or
         the second set of SSB burst sets for RRC connected (CONNECTED) or RRC inactive (INACTIVE) operation; and
      receive, in the resource, the SSB of the particular SSB burst set.

7. The UE of claim 6, wherein the first set of SSB burst sets and the second set of SSB burst sets are transmitted in a common carrier such that at least one SSB burst set of the second set of SSB burst sets occurs during time resources between two consecutive SSB burst sets of the first set of SSB burst sets.

8. The UE of claim 6, wherein the first set of SSB parameters and the second set of SSB parameters differ with regard to at least one parameter, and
   wherein the at least one parameter is at least one of:
      a frequency domain location,
      a set of component channels, whether an SSB is to be omitted in a concurrent frame,
an SSB burst set periodicity, or
a quantity of SSBs in each SSB burst set.

9. The UE of claim 6, wherein a first SSB burst set of the first set of SSB burst sets and a second SSB burst set of the second set of SSB burst sets are located in a common frame.

10. The UE of claim 9, wherein one of the first SSB burst set or the second SSB burst set is dropped in the common frame.

11. The UE of claim 6, wherein a first one or more SSBs of the first SSB burst set include a physical broadcast channel and a second one or more SSBs of the second SSB burst set do not include the physical broadcast channel.

12. The UE of claim 6, wherein the memory and the one or more processors, when selecting the particular SSB burst set, are configured to:
select the particular SSB burst set further based at least in part on a state of the UE and a type of the particular SSB burst set.

13. The UE of claim 6, wherein the memory and the one or more processors, when selecting the particular SSB burst set, are configured to:
select the particular SSB burst set further based at least in part on a use case of information included in the particular SSB burst set and a type of the particular SSB burst set.

14. The UE of claim 6,
wherein the memory and the one or more processors, when selecting the particular SSB burst set, are configured to:
select the particular SSB burst set further based on one of:
the first set of SSB burst sets for relatively coarse time refinement, or
the second set of SSB burst sets for relatively fine time refinement.

15. A method of wireless communication performed by a base station (BS), comprising:
transmitting a first set of synchronization signal block (SSB) burst sets with a first set of SSB parameters; and
transmitting a second set of SSB burst sets with a second set of SSB parameters, wherein the first set of SSB burst sets and the second set of SSB burst sets are transmitted in a common carrier,
wherein a first SSB burst set of the first set of SSB burst sets and a second SSB burst set of the second set of SSB burst sets are located in a common frame, and
wherein the BS is configured to drop one of the first SSB burst set or the second SSB burst set in the common frame.

16. The method of claim 15, wherein the first set of SSB burst sets and the second set of SSB burst sets are transmitted in a common carrier such that at least one SSB burst set of the second set of SSB burst sets occurs during time resources between two consecutive SSB burst sets of the first set of SSB burst sets.

17. The method of claim 15, wherein the first set of SSB parameters and the second set of SSB parameters differ with regard to at least one parameter, and
wherein the at least one parameter is at least one of:
a frequency domain location,
a set of component channels,
whether an SSB is to be omitted in a concurrent frame,
an SSB burst set periodicity, or
a quantity of SSBs in each SSB burst set.

18. The method of claim 15, wherein the BS is configured to transmit the first SSB burst set and the second SSB burst set in the common frame.

19. The method of claim 15, wherein a first one or more SSBs of the first SSB burst set include a physical broadcast channel and a second one or more SSBs of the second SSB burst set do not include the physical broadcast channel.

20. A method of wireless communication performed by a user equipment (UE), comprising:
identifying a resource for receiving a synchronization signal block (SSB) of a particular SSB burst set, of a plurality of types of SSB burst sets,
wherein the plurality of types of SSB burst sets includes a first set of SSB burst sets with a first set of SSB parameters and a second set of SSB burst sets with a second set of SSB parameters, and
wherein the first set of SSB burst sets and the second set of SSB burst sets are transmitted in a common carrier;
selecting, from among the first set of SSB burst sets and the second set of SSB burst sets, a particular SSB burst set, the particular SSB burst set being one of:
the first set of SSB burst sets for radio resource control (RRC) idle (IDLE) operation, or
the second set of SSB burst sets for RRC connected (CONNECTED) or RRC inactive (INACTIVE) operation; and
receiving, in the resource, the SSB of the particular SSB burst set.

21. The method of claim 20, wherein the first set of SSB burst sets and the second set of SSB burst sets are transmitted in a common carrier such that at least one SSB burst set of the second set of SSB burst sets occurs during time resources between two consecutive SSB burst sets of the first set of SSB burst sets.

22. The method of claim 20, wherein the first set of SSB parameters and the second set of SSB parameters differ with regard to at least one parameter, and
wherein the at least one parameter is at least one of:
a frequency domain location,
a set of component channels,
whether an SSB is to be omitted in a concurrent frame,
an SSB burst set periodicity, or
a quantity of SSBs in each SSB burst set.

23. The method of claim 20, wherein a first SSB burst set of the first set of SSB burst sets and a second SSB burst set of the second set of SSB burst sets are located in a common frame.

24. The method of claim 23, wherein one of the first SSB burst set or the second SSB burst set is dropped in the common frame.

* * * * *